May 11, 1926.  W. A. MEIGHAN  1,584,630
PORTABLE SAW
Filed April 16, 1925   2 Sheets-Sheet 1
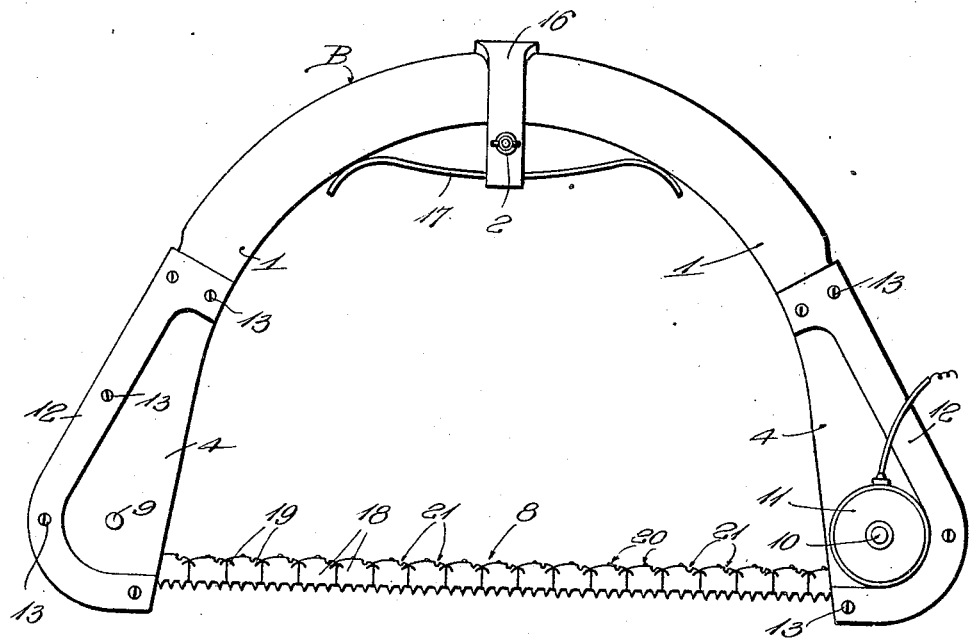
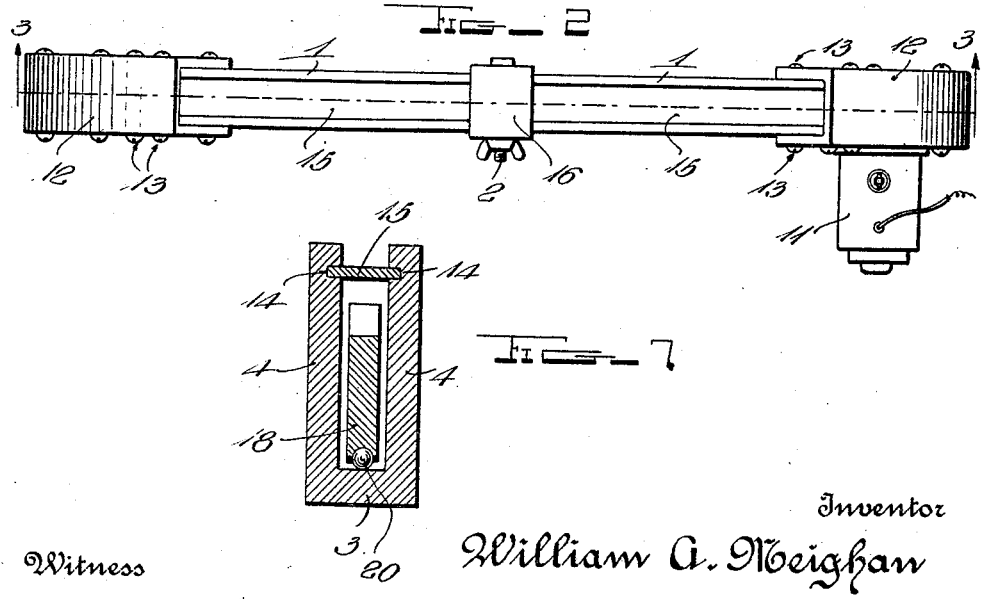
Witness
Inventor
William A. Meighan
By H. R. Willson & Co.
Attorneys

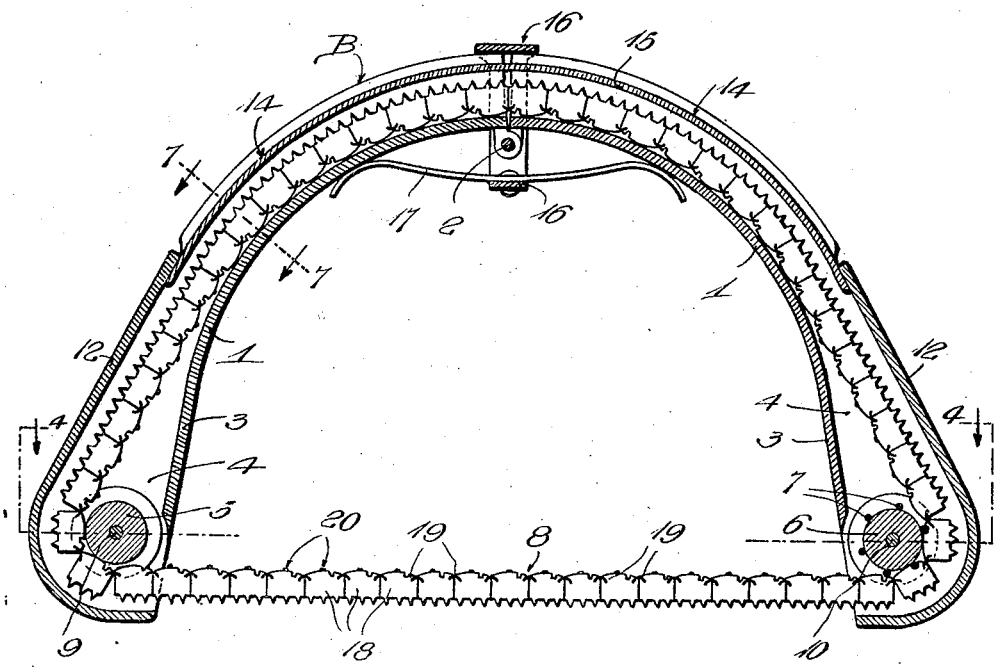
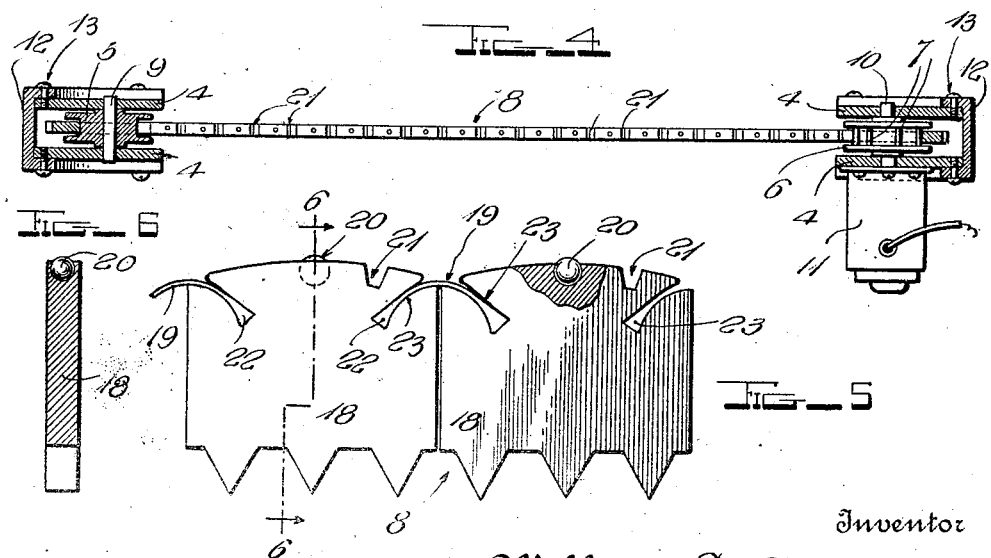

Patented May 11, 1926.

1,584,630

UNITED STATES PATENT OFFICE.

WILLIAM A. MEIGHAN, OF PORTLAND, OREGON.

PORTABLE SAW.

Application filed April 16, 1925. Serial No. 23,606.

My invention relates to improvements in portable saws of a type in which an endless saw is guided by a bow and extends across the space between the ends of this bow.

One object of the invention is to provide a unique form of bow comprising two sections hinged together at their inner ends and having rollers at their outer ends around which the saw passes, unique means being provided for forcing said sections outwardly under the action of a spring, so as to always maintain the active reach of the saw taut, between the two rollers.

Another aim is to provide a bow of simple and light, yet efficient construction.

With the foregoing and minor objects in view, the invention resides in the novel subject matter hereinafter described and claimed, the description being supplemented by the accompanying drawings.

Figure 1 is a side elevation of a saw constructed in accordance with my invention.

Figure 2 is an edge view.

Figure 3 is a sectional view as indicated by line 3—3 of Fig. 2.

Figure 4 is another sectional view on line 4—4 of Fig. 3.

Figure 5 is an enlarged side elevation partly in section of a portion of the saw.

Figure 6 is a detail transverse sectional view on line 6—6 of Fig. 5; and Figure 7 is a detail transverse section on the line 7—7 of Fig. 3.

In the drawings above briefly described, B designates a bow which is preferably formed for the most part of aluminum for sake of lightness. This bow is formed of two halves or sections 1 which are hinged together at 2, at the inner periphery of said bow. Each section is of channel shape and comprises an inner wall 3, and two parallel side flanges 4 projecting outwardly therefrom, said inner wall terminating short of the free ends of the bow. One of these free ends carries a peripherally grooved saw-guiding roller 5 and the other is provided with a similar roller 6 which is formed with teeth 7 for driving an endless saw 8. Both rollers 5 and 6 are located between the side walls 4 of the bow sections, the roller 5 is mounted on a suitable stub shaft 9 passing through said side walls, and the roller 6 is carried by the shaft 10 of an electric motor 11 which is secured to one section of the bow, said shaft passing through the side walls or flanges 4. A pair of channel-shaped guards 12 close the outer sides of the bow sections 1, from their free ends to suitable points between the latter and their inner, hingedly connected ends, said guards being detachably held in place by screws or the like 13 so that they may be readily removed whenever it is necessary to remove all or a portion of the saw. The portions of the side flanges 4, between the inner end of one guard 12 and the inner end of the other guard, are formed with grooves 14 near the outer edges of said flanges. In these grooves, a flexible strip 15 is held to close the space between the outer edge portions of the flanges 4, without interfering with any desired movement of the bow sections 1 about the hinge 2. The ends of this strip 15 preferably lap against the inner sides of the guards 12 as shown in Fig. 3.

A shackle 16 surrounds the meeting ends of the bow sections 1 and is mounted upon the pintle of the hinged connection 2, said shackle extending inwardly to some extent from said pintle. Secured at its center to this shackle is an appropriate spring 17 whose end portions bear against the inner sides of the bow sections 1 and exert a constant stress to spread said sections, thus at all times holding the active reach of the saw 8 taut.

While practically any suitable type of saw could be used with the bow B, I prefer to employ the construction shown, in which a plurality of saw sections 18 are yieldably connected by springs 19 and are provided in their inner edges with ball bearings 20 to run upon the inner wall 3 of the bow sections 1. The inner edges of the sections 18 are also formed with notches 21 to receive the teeth 7 of the driving roller 6, so that when the latter is driven, the saw will be positively operated. The detail construction primarily shown in Fig. 5 including the portions referred to by reference characters 22 and 23, is not claimed herein, but forms the subject matter of my divisional U. S. application Serial No. 60,587, filed Oct. 5th, 1925.

The device is readily portable and is sufficiently light to be readily held by two men, in any desired position for either felling trees or sawing logs. The saw is at all times held taut by the action of the spring 17 and in case of injury to any section of said saw, the injured section may readily be removed and another quickly substituted.

As excellent results are obtainable from the details disclosed, they may well be followed. However, within the scope of the invention as claimed, modifications may of course be made.

I claim:

1. A saw comprising a bow formed of two sections hinged together, said sections having saw-guiding rollers at their outer ends, an endless saw engaged with the bow and trained around said rollers, a spring support mounted at the connected inner ends of the bow sections, and a spring carried by said support, said spring engaging said bow sections and exerting its power to outwardly force the same.

2. A saw comprising a bow formed of two sections hingedly connected with each other on an axis extending transversely of said sections, the hinge including a pintle, a shackle surrounding the connected inner ends of the bow sections and connected with the ends of said pintle to be held in place thereby, said shackle having a portion projecting inwardly from said pintle, an elongated spring connected at its center with said inwardly projecting portion of said shackle, the ends of said spring engaging the inner sides of the bow sections to force the latter normally away from each other, and an endless saw engaged with the bow, the ends of the latter having saw-guiding rollers.

3. A saw bow comprising two channel-shaped sections hinged together at their inner ends and provided at their outer ends with saw-guiding rollers, the side flanges of said channel-shaped sections projecting outwardly and being formed in their inner sides with opposed grooves which extend from the inner extremities of the sections to points spaced from the outer ends of said sections, a flexible strip having its edge portions held in said grooves and constituting a closure for the space between outer edge portions of the aforesaid flanges, and detachable closures for the spaces between the ends of said strip and the free ends of the bow sections, said detachable closures being disposed at the outer edges of the aforesaid flanges.

In testimony whereof I have hereunto affixed my signature.

WILLIAM A. MEIGHAN.